United States Patent [19]
Wu

[11] Patent Number: 5,567,458
[45] Date of Patent: Oct. 22, 1996

[54] METHOD AND APPARATUS FOR AUTOMATIC ADIABATIC COOKING

[76] Inventor: James M. Wu, 23506 Community St., West Hills, Calif. 91304

[21] Appl. No.: 382,610

[22] Filed: Feb. 2, 1995

[51] Int. Cl.⁶ .............................. A23L 1/01; A47J 27/00; A47J 37/00; H05B 1/02
[52] U.S. Cl. .............................. 426/233; 99/330; 99/331; 99/340; 99/403; 99/413; 99/468; 219/433; 219/441; 219/472; 219/494; 219/497; 426/438; 426/510; 426/523
[58] Field of Search ............................ 99/325–333, 344, 99/337, 338, 403–418; 126/373, 374, 390, 369; 219/433, 435, 438, 441, 442, 492, 494, 497, 400, 401, 486, 491, 506, 719; 426/233, 438, 523, 243, 510, 511, 418

[56] References Cited

U.S. PATENT DOCUMENTS

| | | |
|---|---|---|
| 4,307,287 | 12/1981 | Weiss .......................................... 99/333 |
| 4,315,139 | 2/1982 | Onishi et al. ............................ 219/441 |
| 4,362,923 | 12/1982 | Aoshima .................................. 219/492 |
| 4,421,974 | 12/1983 | Oota et al. ............................... 219/433 |
| 4,431,906 | 2/1984 | Oota et al. ............................... 219/494 |
| 4,441,016 | 4/1984 | Oota et al. ............................... 219/494 |
| 4,672,179 | 6/1987 | Onishi et al. ............................. 99/403 |
| 5,048,400 | 9/1991 | Ueda et al. ................................ 99/332 |
| 5,092,229 | 3/1992 | Chen ......................................... 99/337 |
| 5,355,777 | 10/1994 | Chen et al. . |
| 5,429,039 | 7/1995 | Chang ....................................... 99/331 |

FOREIGN PATENT DOCUMENTS

| | | |
|---|---|---|
| 4-371113 | 12/1992 | Japan . |
| 5-253058 | 10/1993 | Japan . |

*Primary Examiner*—Timothy F. Simone
*Attorney, Agent, or Firm*—Fulwider Patton Lee & Utecht

[57] ABSTRACT

The energy conserving automatic insulated thermal cooker comprises an inner pot having a cover, and an outer insulated container having an insulated cover. The outer container also houses an electric heater, a thermal sensor, a microprocessor control and timer unit, an electric power plug, and a front control panel. Operation of the cooking apparatus is fully automatic with clear display of boiling time, cooking time and the active heating and adiabatic cooking modes.

22 Claims, 4 Drawing Sheets

METHOD AND APPARATUS FOR AUTOMATIC ADIABATIC COOKING

BACKGROUND OF THE INVENTION

1. Field of the Invention

This invention relates generally to insulated thermal cooking devices, and more particularly concerns a system and method for controlling adiabatic cooking in an insulated adiabatic cooking apparatus, such as for use as a home cooking apparatus.

2. Description of Related Art

Energy conserving cooking presently can be accomplished with conventional insulated adiabatic cookers that are not directly heated by an internal or external source of heat, but that are insulated to significantly slow heat loss in order to allow the food or other items to continue to cook due to the retention of heat from preheating prior to placement in the adiabatic cooker. Such cookers typically consist of an inner pot with a cover made of stainless steel, and a thermally insulated outer container, typically also having a cover made of stainless steel, or a combination of plastic and stainless steel. For purposes of this application, adiabatic cooking is defined herein as cooking of food or other items with minimal heat gain or loss, by heat retained from preheating of the food or other items to be cooked. Currently, all such commercially available cookers can be grouped as to the two basic types of insulation they utilize. One type of insulated adiabatic cooker utilizes a vacuum to provide insulation, and another type utilizes a layer of an insulating material, such as a polyurethane material.

Such insulated adiabatic cookers are usually operated by first boiling the food in the inner pot on an external stove for a specific length of time, depending upon the type of food being cooked. After the specific boiling time is reached, the inner pot is placed into an insulated outer container for additional cooking by using the heat in the inner pot, generated from initially boiling the food. This type of cooking is commonly known as "Thermo Cooking", and one such type of insulated adiabatic cooker is available under the trade name "Thermo Cooker." Such thermally insulated adiabatic cooking containers commonly have good heat insulating characteristics such that the food in the inner pot can be maintained at a temperature above 90 degrees centigrade for up to two hours when the inner pot is placed in the thermally insulated outer container. Food typically continues to be cooked when the temperature of the food is 90 degrees centigrade or higher.

Such conventional thermally insulated adiabatic cookers frequently have several shortcomings. For example, the cooking of the food in the inner pot must be supervised, both while the food in the inner pot is heated to bring it to a boil, and subsequently while the contents are boiled for the specific boiling time required for the specific food being cooked, such as 5 minutes for the chicken, 15 minutes for the beef or lamb, etc. This can be a very troublesome task for a person performing the cooking.

Another disadvantage is that after the food has been initially boiled in the inner pot, the hot inner pot must be transferred to the thermally insulated container. The inner pot at this time is very hot and dangerous to move.

In addition, when a conventional thermally insulated adiabatic cooker is to be used to cook food, the container is typically at room temperature. After the inner pot is brought to a boil and put into the insulated container, the outer insulated container will absorb heat from the inner pot until the temperature of the inside of the outer container is the same as the inner pot temperature. As much as five degrees centigrade of heat or more can be dissipated from the inner pot in this manner during the first hour, which is a very large loss of heat, especially since the heat is needed most during the first hour to permit adiabatic cooking.

Furthermore, when the food is adiabatically cooked in the insulated container, one has to remember or write down the time the adiabatic cooking begins, and watch the cooking time. Different foods require different adiabatic cooking times, such as 15 minutes for vegetables, 30 minutes for fish, 60 minutes for chicken or pork, and 90 minutes for the beef and lamb, and the like. In order to avoid overcooking of the food, the adiabatic cooking time in the insulated container has to be monitored closely.

In addition, when cooked food is left in the thermally insulated adiabatic cooker for more than 8 hours, the food can spoil, because the temperature of the food can fall below 70 degrees centigrade. Bacteria can grow in food when the temperature of the food is below than 70 degrees centigrade, so that any food left in the adiabatic cooker when the temperature falls below 70 degrees centigrade needs to be either refrigerated, or brought to a temperature above 70 degrees centigrade again in the inner pot, if the food is to be kept in the insulated container, either of which can be a troublesome task. Therefore, food left in such conventional cookers after the temperature in the cooker falls below 70 degrees centigrade can easily spoil.

It would therefore be desirable to provide a fully automatic thermally insulated combination active and adiabatic cooker and a method of cooking, that can provide solutions to the foregoing problems of conventional insulated adiabatic cookers, and that can provide for savings of time and energy, environmental friendliness, and multi-functionality, and that can cook with or without internal heat being supplied by the cooker. The present invention meets these needs.

SUMMARY OF THE INVENTION

Cooking with conventional thermally insulated adiabatic cookers frequently requires close supervision during the initial heating of food to a cooking temperature, careful handling of heated food while it is transferred to the insulated container for adiabatic cooking, and after the food is placed in the adiabatic cooker container to prevent overcooking and spoilage of the food. Transferring an externally heated pot to an insulated adiabatic cooker container can further needlessly reduce the cooking temperature of food to be cooked by equilibration of the temperature of the outer insulated container with the heated food to be cooked. The automatic thermally insulated cooking apparatus and method of cooking of the invention provide for both active and adiabatic cooking of items to be cooked, eliminating the need for external heating, transfer to the insulated container, unnecessary heat loss, close supervision during cooking, and refrigeration or reheating of items cooked.

Briefly, and in general terms, the present invention provides for an energy conserving cooking apparatus comprising an inner cooking pot having an open top and a cover for closing the open top, and an insulated outer container having an open top and a cover for closing the open top. The insulated outer container includes a housing having an outer wall, an inner wall, and an inner receptacle contained within the inner wall for receiving the inner cooking pot. A heater is disposed in the outer container for heating the inner cooking pot, and a temperature sensor is disposed in the outer container for sensing the temperature of the inner cooking pot. Means are also provided for controlling the heating of the ingredients to be cooked in two modes. In a first cooking mode, water and ingredients to be cooked are actively heated for a specific time and for discontinuing heating of the ingredients, and in a second cooking mode, the ingredients to be cooked are adiabatically cooked by heat retained in the ingredients and the inner cooking pot. An insulation space is preferably defined between the first and second walls of the outer container, so that the outer container can be insulated by a vacuum in the space, or insulation such as glass or ceramic fiber. The cover of the insulated outer container also preferably includes an insulation space defined between top and bottom walls of the cover of the outer container that can also be insulated by a vacuum in the space, or insulation such as glass or ceramic fiber. The control unit of the cooking apparatus preferably also includes a control panel on outside of the insulated outer container for setting a specified actively heated cooking time, a timer for measuring a period of elapsed time of cooking from when heating is discontinued until the temperature of the inner cooking pot falls to a predetermined minimum cooking temperature, and a display for displaying the elapsed time of cooking. In one currently preferred embodiment, the control unit includes a microprocessor controller connected to the temperature sensor for determining when the temperature of the inner cooking pot falls to a predetermined minimum warm temperature, heating the inner cooking pot to keep the ingredients in the inner cooking pot warm, determining when the temperature of the inner cooking pot rises to a predetermined maximum warm temperature below the predetermined cooking temperature, and discontinuing heating of the inner cooking pot to keep the temperature of the inner cooking pot at or above the minimum warming temperature and below the maximum warming temperature.

In the method of cooking in an energy conserving cooking apparatus according to the invention, the water and ingredients to be cooked are placed in the inner cooking pot, and the inner cooking pot is placed in the outer insulated container. The control unit is set to cause the heater of the apparatus to heat the ingredients in the inner cooking pot for a specified period of time, and to discontinue heating of the ingredients at the expiration of the specified period of time. The water and ingredients in the inner cooking pot are heated by the heater, and the heat sensor senses when the water in the inner cooking pot commences to boil. The water and ingredients in the inner cooking pot continue to be heated for the specified period of time, at which time heating of the ingredients in the inner cooking pot is discontinued by the control unit. The ingredients in the inner cooking pot, disposed in the outer insulated container, are allowed to continue to cook at a temperature above a predetermined minimum cooking temperature by heat retained in the inner and outer containers, without additional heat being provided from the heat generator. The control unit preferably further determines when the temperature of the inner cooking pot falls to a predetermined minimum warm temperature, and causes heating of the inner cooking pot to keep the ingredients in the inner cooking pot warm. In a currently preferred embodiment, the control unit further determines when the temperature of the inner cooking pot rises to a predetermined maximum warm temperature below the predetermined cooking temperature, and causes heating of the inner cooking pot to be discontinued, to keep the temperature of the inner cooking pot at or above the minimum warming temperature, and the control unit preferably automatically repeatedly reheats the items in this manner to keep them warm enough to prevent spoilage, but not so warm as to overcook them. In one presently preferred embodiment, the minimum cooking temperature is approximately 90° C., the minimum warm temperature is approximately 70° C., and the maximum warm temperature is approximately 88° C.

These and other aspects and advantages of the invention will become apparent from the following detailed description, and the accompanying drawing, which illustrates by way of example the features of the invention.

DETAILED DESCRIPTION OF A PREFERRED EMBODIMENT

Figure 1:
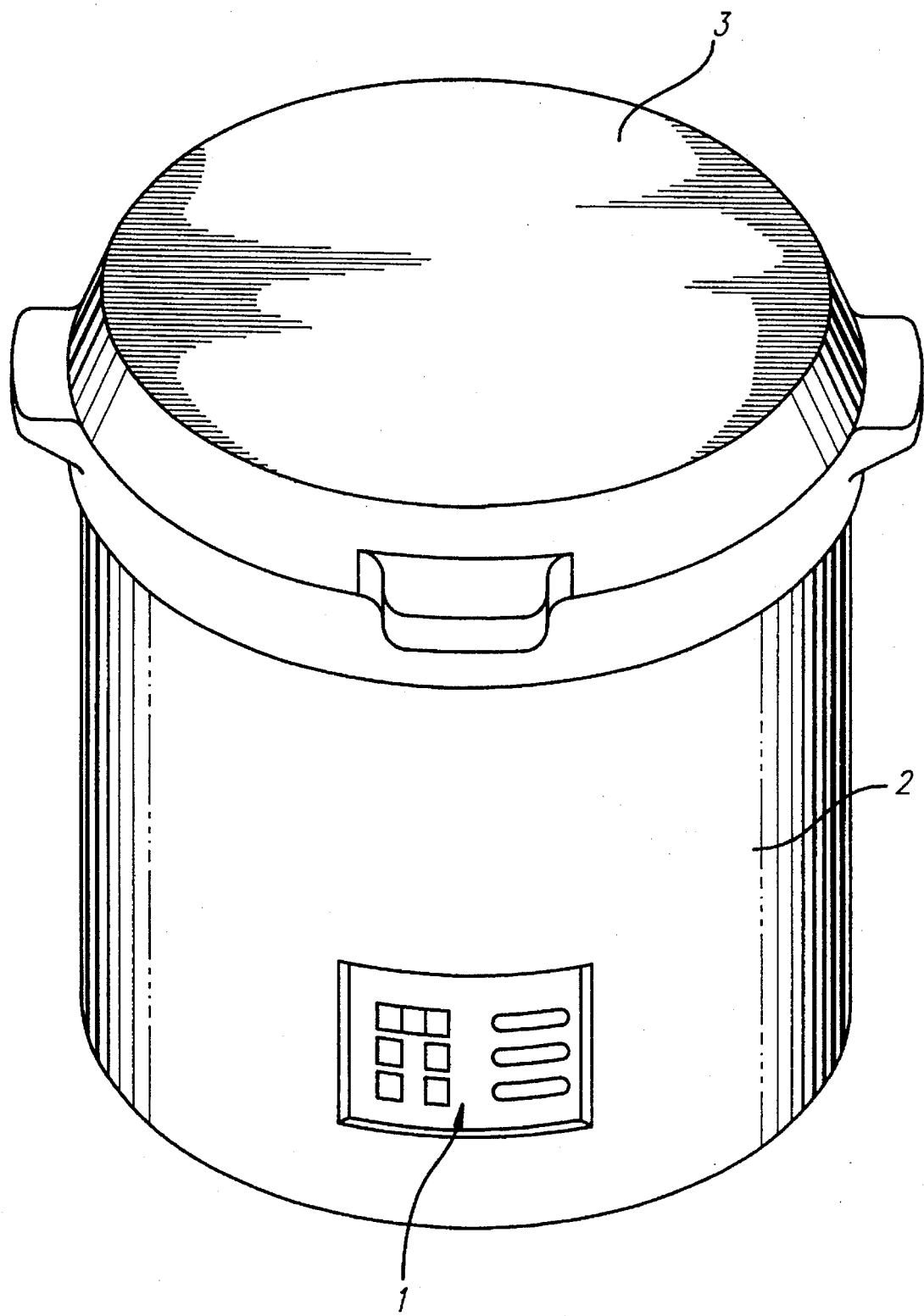
FIG. 1 is a front perspective view of an energy conserving cooking apparatus according to the invention.

As is illustrated in the drawings, the invention is embodied in a fully automated insulated cooker. With reference to FIG. 1, a front control panel 1 is provided on the insulated outer container 2 for setting the boiling time and monitoring of the boiling time and cooking time. Three mode display lamps for BOILING, COOKING and KEEP WARM mode are also provided.

Figure 2:
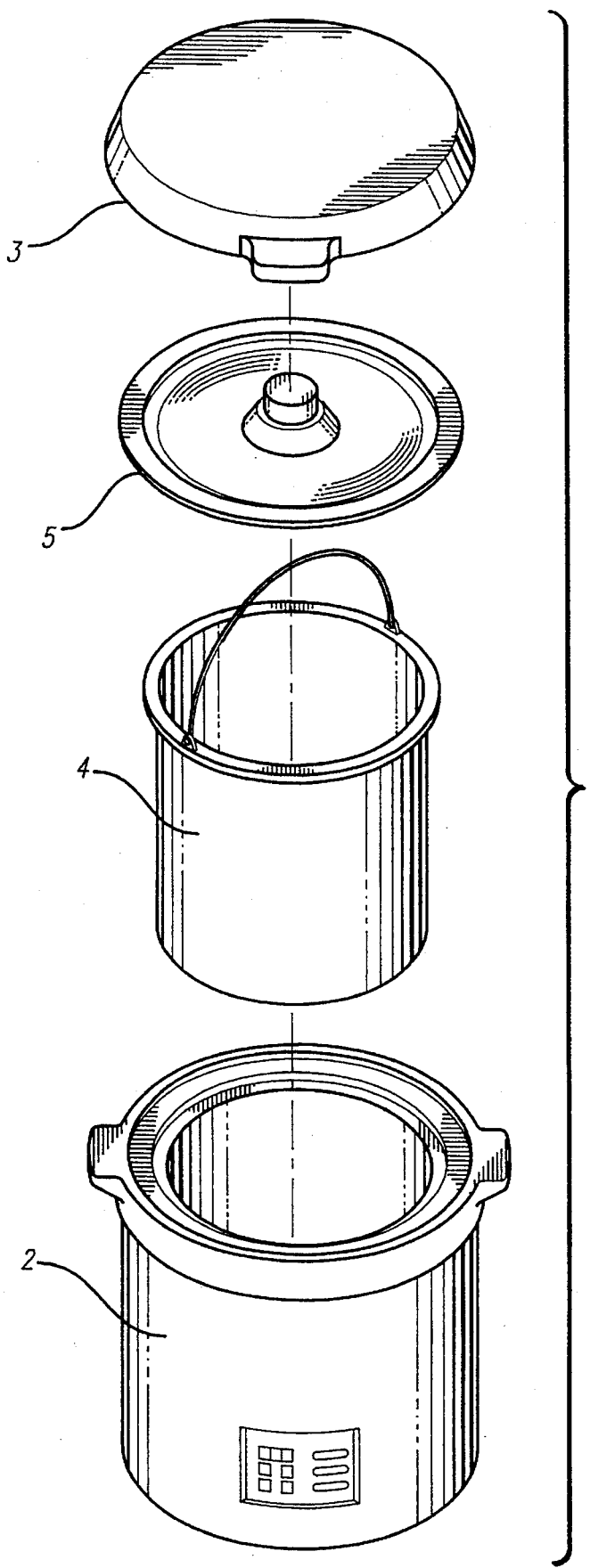
FIG. 2 is an exploded view, showing the top cover, inner container and its cover, and the outer insulated container of the energy conserving cooking apparatus of FIG. 1.

As is shown in FIG. 2, the cooking apparatus of the invention uses the basic insulated adiabatic cooker construction, namely an insulated outer container 2 with its insulated cover 3, and an inner pot 4 with its inner pot cover 5, so that the cooking apparatus can be used as a adiabatic cooker.

Figure 3:
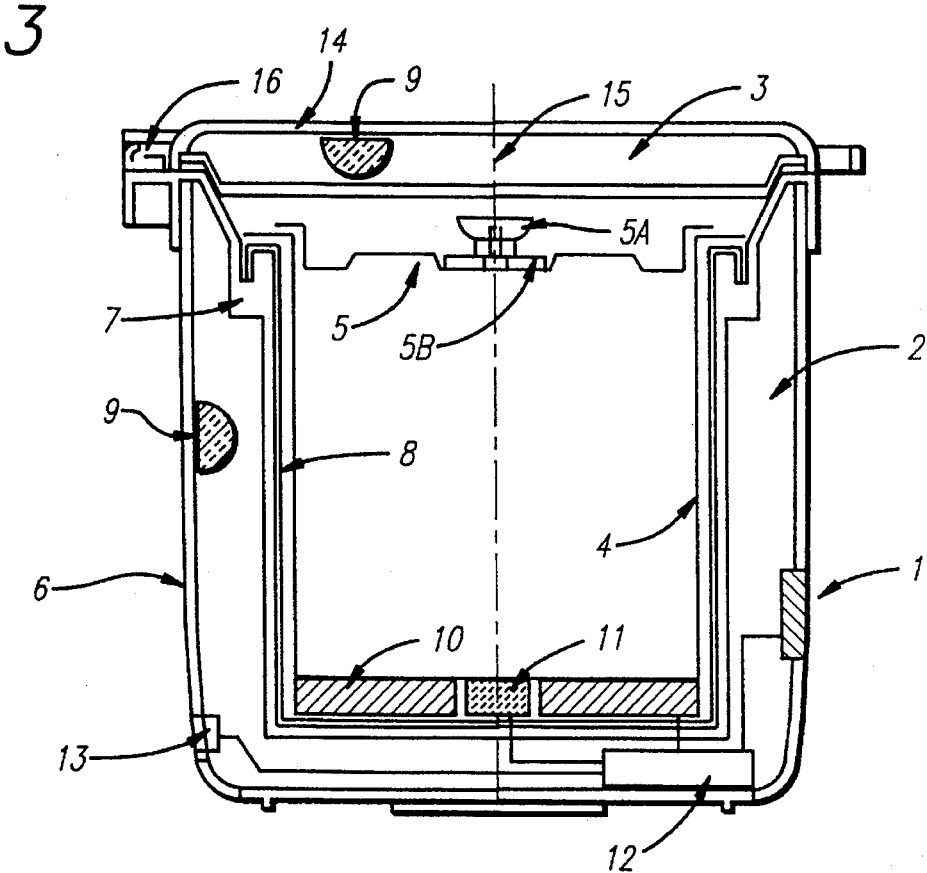
FIG. 3 is a cross-sectional view of the energy conserving cooking apparatus of FIG. 1.

The cooker apparatus of the invention also includes an electric heater 10, a temperature sensor 11, such as a thermocouple for example, a microprocessor control and timer unit 12, an electric power plug 13, and a front control panel 1 with a digital display as shown in FIGS. 1 and 2. As is shown in FIG. 3, the outer insulated container 2 includes a high temperature plastic outer wall 6, a high temperature plastic inner wall 7, and an aluminum inner receptacle 8 for receiving the inner pot. The space between the outer wall 6 and the inner wall 7 is typically filled with a heat insulation material 9, such as glass fiber or ceramic fiber for heat insulation purposes, although the space can also contain a vacuum for purposes of insulation. The thickness of the heat insulation material 9 is typically about 25 mm. An electric heater 10 and a temperature sensor, preferably a thermocouple 11, are installed on the bottom of the aluminum inner receptacle 8. A microprocessor control unit 12 including a timer unit is housed in the bottom of the outer wall 6. A front control panel 1 is installed in the front of the outer wall 6. An electric power plug 13 providing power to the control unit and control unit is installed at the rear of the outer wall 6. A cover hinge 16 is provided on the inner wall 7 for mounting the outer container insulated cover 3. The insulated cover 3 is also preferably made of high temperature plastic with a heat insulation material 9, such as glass fiber or ceramic fiber, between the top lid 14 and the bottom lid 15, although the space between the top and bottom lids can also contain a vacuum to insulate the cover. The thickness of the heat insulation material 9 in the insulated cover is also typically about 25 mm.

The inner pot 4 and its cover 5 can, for example, be constructed of stainless steel (S/S 304 material), or of a high temperature ceramic. For a stainless steel inner pot cover 5, a cover knob 5A and its plate 5B, both made of bakelite, can be provided. The stainless steel inner pot can be used for cooking ordinary foods, while the ceramic inner pot can be used to cook Chinese herb medicines or any foods better to be cooked with a ceramic pot. Different inner pot capacities can be provided, such as 3 liters (small), 4.5 liters (medium), or 6 liters (large) sizes, for example.

Figure 4:
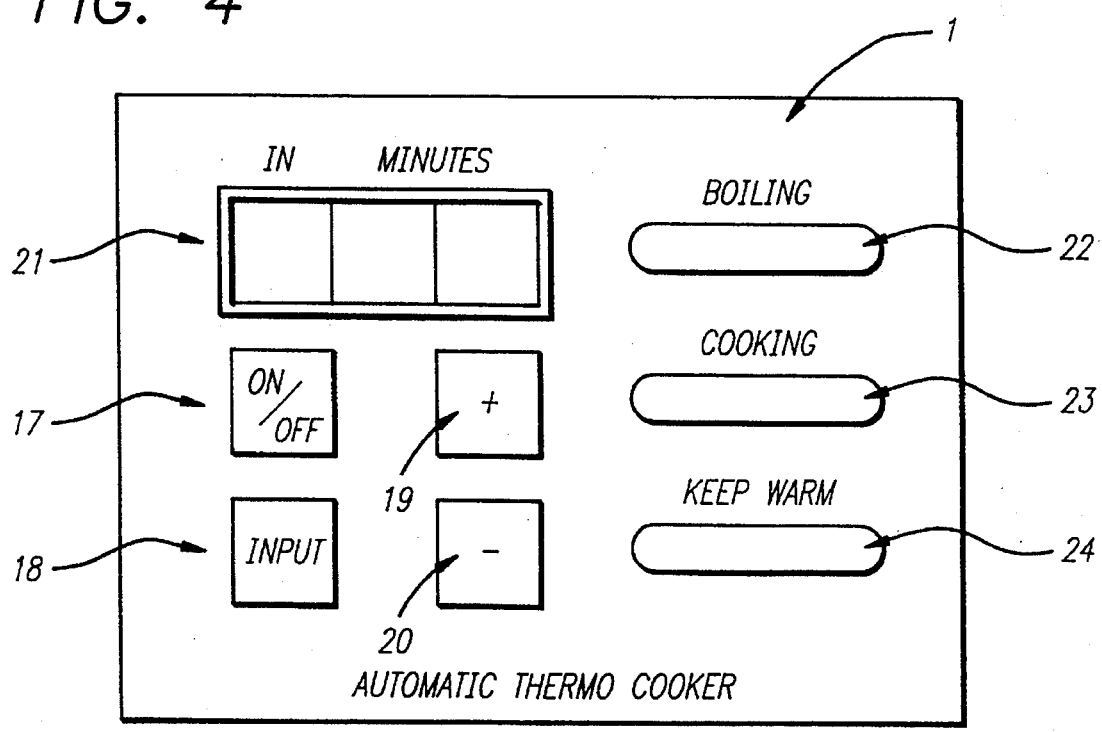
FIG. 4 is an elevational view of a front control panel of the control unit of the energy conserving cooking apparatus of FIG. 1.

As shown in FIG. 4, the front control panel 1 provides an ON/OFF push button 17, an INPUT push button 18, a "+" push button 19, and a "−" push button 20 for setting the boiling time desired. A digital time display 21 is provided for monitoring the boiling time and the cooking time. Three mode pilot lamps; BOILING 22, COOKING 23, and KEEP WARM 24 are also provided to display the automatic insulated cooker COOKING mode.

Figure 5:
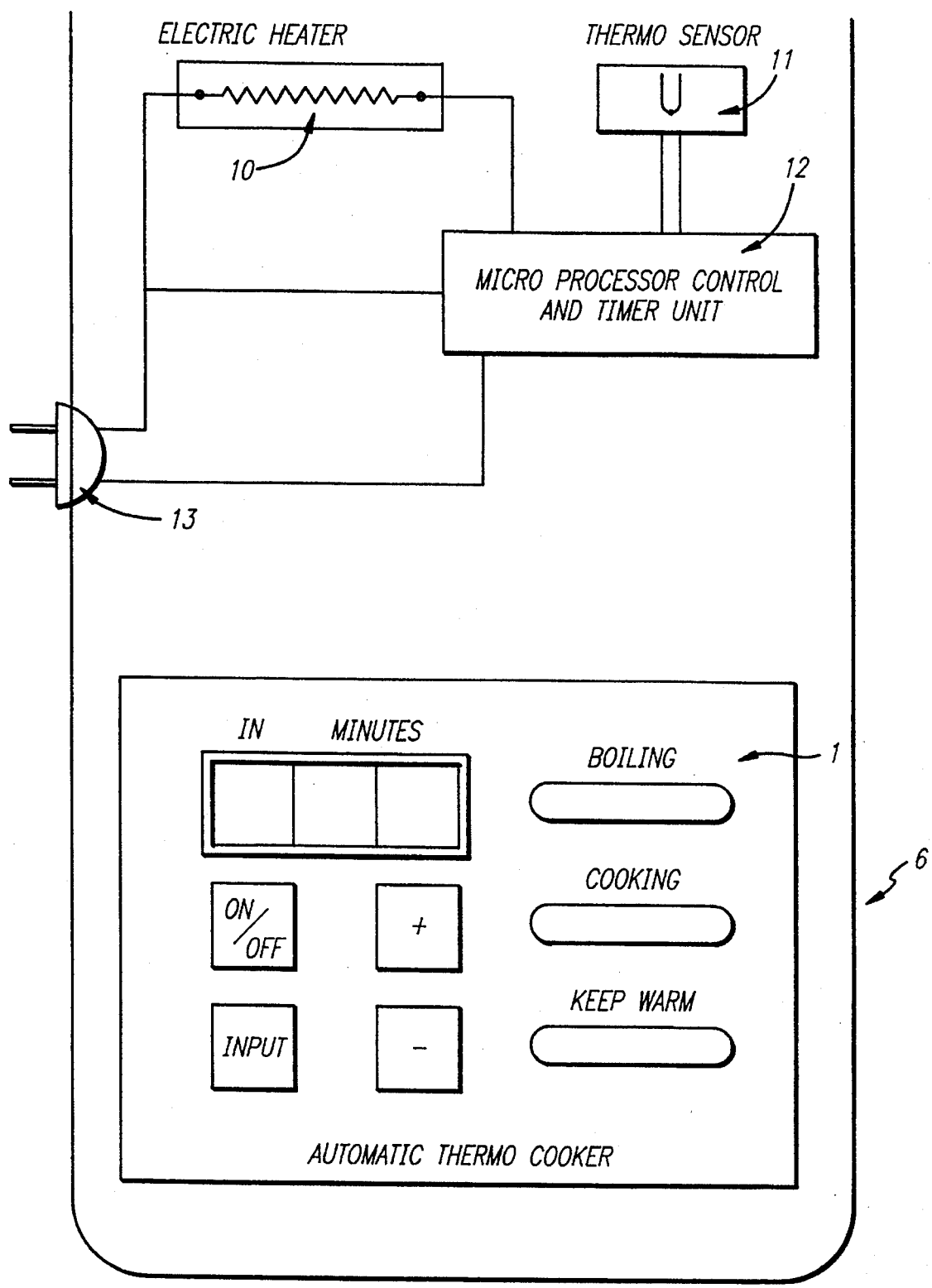
FIG. 5 is an electrical circuit block diagram of the energy conserving cooking apparatus of FIG. 1.

FIG. 5 shows the electrical circuit block diagram of the energy conserving insulated cooker. The electric power is fed from the electric power plug 13 to the microprocessor control and timer unit 12. Based on the boiling time set on the front control panel 1, and the temperature signal fed by the thermocouple 11, the microprocessor control and timer unit 12 will turn on or off the electric heater 10 as required automatically.

Based on the boiling time set by the front control panel 1, the microprocessor control and timer unit 12 will first heat the food to boil then keep boiling it with a reduced electric power till the selected boiling time is reached. Neither the inner pot cover or the outer container insulated cover are locked. Therefore, steam in the inner pot or insulated outer container can escape when the pressure in the inner pot or the outer container become sufficient to lift the covers. During the initial boiling mode, the front control panel digital display 21 will show the boiling time by counting it down from the set time to zero. When the selected boiling time is reached, the microprocessor control and timer unit 12 will cut off electrical power to the electric heater 10 and the food will go into a adiabatic cooking mode utilizing the heat generated from the initial boiling stage. The BOILING pilot lamp 22 on the front control panel will then be turned off and the COOKING pilot lamp 23 will be turned on.

This scheme eliminates the need for supervising the boiling time as is required with current insulated adiabatic cookers. The boiling of the food is done automatically without human attention required. No manual measuring of the boiling time is also required. This scheme also eliminates the bother and danger of moving the very hot inner pot from the stove to the insulated outer container. In addition, since the boiling of the food in the inner pot is done in the insulated outer container, the interior of the insulated outer container is also heated during the time of boiling the inner pot content. Tests of an energy conserving insulated cooking apparatus according to the invention have shown that during the first hour of adiabatic cooking, the temperature in the inner pot is 97 degrees centigrade or higher, which is 3 to 4 degrees centigrade higher than in conventional insulated adiabatic cookers. With a higher adiabatic cooking temperature, food will be cooked quicker than with conventional insulated adiabatic cookers as well.

When the automatic energy conserving insulated cooker according to the invention is in the adiabatic cooking mode, the front control panel digital display will show the cooking time from 1 minute to when the food temperature drops under 90 degrees centigrade. At that time the digital display will keep displaying the last accumulated cooking time, and the COOKING pilot lamp 23 will be switched off while the KEEP WARM pilot lamp 24 will be turned on.

Advantageously, an operator can thus readily observe the adiabatic cooking in progress and know at any time how long the cooking process has progressed. The operator can then decide when to remove the food from the cooker for serving, or to stop further cooking of the items being cooked.

After the food is cooked and kept warm in the energy conserving cooker of the invention, after a period of time of up to 8 hours or more, the food temperature will eventually drop to lower than 70 degrees centigrade. At this time the cooker apparatus of the invention will automatically heat the food to 88 degrees centigrade, and will then turn the electric heater off. The food will remain at a temperature above 70 degrees centigrade for another 5 hours or more. Every time the food temperature drops below 70 degrees centigrade, the reheating process will repeat automatically.

This feature eliminates the need for the operator to check the food's temperature, reheat manually, or keep the food in the refrigerator. With the cooking apparatus of the invention, the cooked food will not spoil, since it is always maintained at a temperature above 70 degrees centigrade, and can be ready to be enjoyed at any time.

In addition, when electricity is not available, the cooking apparatus of the invention can also perform the adiabatic cooking function after boiling food in the inner pot externally with any heat source, such as gas, coal, or wood. The boiled items in the inner pot can then be placed into the insulated outer container to continue cooking without additional heating. This mode of cooking is identical to that of ordinary insulated adiabatic cookers. The energy conserving insulated cooker is thus designed to be capable of cooking either with or without electricity.

The steps of the method of operation of the automatic cooking apparatus of the invention, will now be described in detail below:

1. When one is ready to cook a food or other items in the energy conserving insulated cooker, first the ingredients, the seasoning and a proper amount of water specified in the recipe are placed into the inner pot. The inner pot is then placed in the inner receptacle of the outer container, and the electric cord is connected to the electric power plug 13.

2. Referring to the desired recipe, one will set the boiling time using the front control panel 1 by first pushing the ON/OFF button 17. The ON/OFF button 17 will light up to show that the electric power is applied to the microprocessor control and timer unit 12.

3. Then one will push the "+" button 19 to select the boiling time desired. Every time the "+" button 19 is pushed, the digital display 21 will display one digit, from 1 and increment upward. For instance, 5 minutes of boiling time is desired, one has to push the "+" button 19 five times. If one over pushed the "+" button 19, and wants to have less time than what is shown on the digital display 21, one can push the "−" button 20 to decrement the displayed boiling time. The "−" push button 20 also decrement one minute each time the button 20 is pushed. After the desired time is displayed on the digital display 21, one should push the INPUT button 18 to input the selected boiling time to the microprocessor control and timer unit 12. At this time, the microprocessor control and timer unit 12 will turn off the ON/OFF button 17 light, and turn on the BOILING pilot lamp 22 on the front control panel 1, and also feeds electric power to the electric heater 10.

4. The electric heater 10 will heat up the inner pot 4 until the food boils. The temperature sensor 11 will sense the temperature at the bottom of the inner pot 4 continuously. When the inner pot content begins to boil, the boiling temperature signal will trigger the microprocessor control and timer unit 12 to start counting down the boiling time. The boiling time count down signal will be also fed to the digital display 21 on the front control panel 1. The digital display 21 will also start count down the boiling time. In the mean time, the microprocessor control and timer unit 12 will reduce the electrical power from a high setting to medium setting to the electric heater 10. For a 4.5 liter inner pot, the high wattage will be 650 watts and the medium wattage will be 400 watts. This is to prevent the food content from overflowing, but still keeps the inner pot 4 boiling.

Neither the inner pot cover or the outer container insulated cover are locked closed. Therefore, when the boiling time is long and the pressure in the inner pot builds up sufficiently, the steam will push open the inner pot cover a little and escape to the insulated outer container. The high pressure in the inner pot will be then reduced. If high pressure is also building up in the insulated outer container, the steam can also escape out by push up the outer container insulated cover a little. At any time, there will be no danger similar to that with a pressure cooker.

5. When the boiling time is reached, the microprocessor control and timer unit 12 will cut off the electric power to the electric heater 10, turn off the BOILING pilot lamp 22, and turn on the COOKING pilot lamp 23 on the front control panel 1. The energy conserving insulated cooker is now in the adiabatic cooking mode. The food is cooked continuously without electricity from this point on. The microprocessor control and timer unit 12 will also start to count up the adiabatic cooking time and feeds the time signal to the digital display 21 on the front control panel 1. The counting up of the adiabatic cooking time will continue until the thermocouple 11 senses that the inner pot 4 food temperature has dropped to 90 degrees centigrade. At that time the microprocessor control and timer unit 12 will stop counting the cooking time and turn off the COOKING pilot lamp 23 and turn on the KEEP WARM pilot lamp 24 on the front control panel 1. The digital display 21 will continuously show the last cooking time registered. Now the food is cooked and ready to be served or will be kept warm in the energy conserving insulated cooker.

By watching the adiabatic cooking time on the digital display 21 on the front control panel 1, one can terminate the adiabatic cooking mode by removing the inner pot from the insulated outer container at any time as desired. For fish, the adiabatic cooking time required is 30 minutes, while for vegetable, the required adiabatic cooking time is only 15 minutes.

6. When the energy conserving insulated cooker is in KEEP WARM mode, the microprocessor control and timer unit 12 will continuously monitor the inner pot 4 temperature with the temperature sensor 11. As soon as the food temperature in the inner pot 4 dropped to about 70 degrees centigrade, the microprocessor control and timer unit 12 will feed the electric power to the electric heater 10 to heat up the inner pot 4 food to about 88 degrees centigrade. When the inner pot 4 food temperature reaches about 88 degrees centigrade, the microprocessor control and timer unit 12 will turn off the electric power to the electric heater 10. The food in the inner pot 4 will be above 70 degrees centigrade for at least another 5 hours or longer. Every time the food temperature in the inner pot 4 drops down to 70 degrees centigrade, the same heating up process will repeat as described above. The reason that heating is stopped at 88 degrees centigrade food temperature is so that the food will not be over cooked. The food will cook when the temperature is above 90 degrees centigrade.

7. When one wants to cook the second time, one should repeat Item 1 described above. One should put the ingredients, seasoning and water in the inner pot, cover the inner pot cover 5 and the outer container insulated cover 3, and push the ON/OFF button 17 on the front control panel 1. At this time the KEEP WARM pilot lamp 24 will be turned off and the ON/OFF button 17 light will be turned on by the microprocessor control and timer unit 12. The rest of the operations will repeat as described in Item 2 and on. If one disconnected the electric power cord from the electric power plug 13, one should repeat from item 1 above.

It will be appreciated that the energy conserving insulated cooker of the invention is fully automatic and provides a clear display of boiling time, cooking time and BOILING, COOKING and KEEP WARM modes. All one has to do is to put in the food ingredients, seasoning, and proper amount of water in the inner pot, and set the boiling time using the front control panel. Everything else will be performed automatically by the energy conserving insulated cooker. It is multi-functional, capable of cooking rice, porridge, beans, chicken, pork, beef, lamb, fish, vegetable, Chinese herb medicines, and variety of western or eastern cuisines with minimum of electrical power consumption. When electricity is not available, the energy conserving insulated cooker still can perform cooking similar to the ordinary insulated adiabatic cookers. With this invention the period of consuming the electrical power will be kept minimal, and all the cooking operations will be fully automatic. The energy conserving insulated cooker of the invention is an energy saving, time saving, most convenient to use, environmentally friendly, and multi-functional cooking apparatus.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. An energy conserving cooking apparatus comprising:

an inner cooking pot having an open top and a cover for closing said open top;

an insulated outer container having an open top and a cover for closing said open top, said insulated outer container including a housing having an outer wall, an inner wall, and an inner receptacle contained within said inner wall for receiving said inner cooking pot;

a heater disposed in said outer container for heating said inner cooking pot;

a temperature sensor disposed in said outer container for sensing the temperature of said inner cooking pot; and means for controlling the heating of the ingredients in a first cooking mode in which water and ingredients to be cooked are actively heated for a specific time and for discontinuing heating of the ingredients in a second cooking mode in which the ingredients to be cooked are adiabatically cooked by retaining heat generated in said first cooking mode and without additional heat being provided from said heater.

2. The energy conserving cooking apparatus of claim 1, wherein said first and second walls of said outer container define an insulation space therebetween.

3. The energy conserving cooking apparatus of claim 2, wherein said outer container insulation space contains glass fiber insulation.

4. The energy conserving cooking apparatus of claim 2, wherein said outer container insulation space contains ceramic fiber insulation.

5. The energy conserving cooking apparatus of claim 2, wherein said outer container insulation space contains a vacuum.

6. The energy conserving cooking apparatus of claim 1, wherein said cover of said insulated outer container comprises top and bottom walls defining an insulation space therebetween.

7. The energy conserving cooking apparatus of claim 6, wherein said outer container cover insulation space contains glass fiber insulation.

8. The energy conserving cooking apparatus of claim 6, wherein said outer container cover insulation space contains ceramic fiber insulation.

9. The energy conserving cooking apparatus of claim 6, wherein said outer container cover insulation space contains a vacuum.

10. The energy conserving cooking apparatus of claim 1, wherein said means for controlling comprises a control panel on said insulated outer container for setting the specified actively heated cooking time.

11. The energy conserving cooking apparatus of claim 1, wherein said means for controlling comprises a timer for measuring a period of elapsed time of cooking from when heating is discontinued until the temperature of said inner cooking pot falls to a predetermined minimum cooking temperature, and further including display means for displaying said elapsed time of cooking.

12. The energy conserving cooking apparatus of claim 1, wherein said means for controlling comprises a microprocessor controller means connected to said temperature sensor for determining when the temperature of said inner cooking pot falls to a predetermined minimum warm temperature, heating said inner cooking pot to keep the ingredients in said inner cooking pot warm, determining when the temperature of said inner cooking pot rises to a predetermined maximum warm temperature below said predetermined cooking temperature, and discontinuing heating of said inner cooking pot to keep the temperature of said inner cooking pot at or above said minimum warming temperature and below said maximum warming temperature.

13. A method of cooking in an energy conserving cooking apparatus having an inner cooking pot for receiving water and ingredients to be cooked, and an outer insulated container for receiving the inner cooking pot, the outer insulated container including a heat generator, a thermal sensor for sensing when water in said inner cooking pot commences top boil, said method including the steps of actively heating water and ingredients to be cooked for a specific time in a first cooking mode and discontinuing heating of the ingredients in a second cooking mode in which the ingredients to be cooked are passively cooked by retaining heat generated in said first cooking mode, and said apparatus including means for controlling the cooking of the ingredients in said first and second cooking modes connected to the electric heater and the thermal sensor means, the method comprising the steps of:

a) placing said water and ingredients to be cooked in said inner cooking pot;

b) placing said inner cooking pot and the water and ingredients therein to be cooked in said outer insulated container;

c) setting said means for controlling to cause said heat generator to heat the ingredients in said inner cooking pot for a user specified period of time, and to discontinue heating of the ingredients at the expiration of said specified period of time;

d) heating the water and ingredients in said inner cooking pot with said heat generator;

e) sensing when the water in said inner cooking pot commences to boil with said thermal sensor;

f) continuing to heat the water and ingredients in said inner cooking pot for said user specified period of time;

g) discontinuing heating of the ingredients in said inner cooking pot with said heat generator; and h) allowing the ingredients in said inner cooking pot disposed in said outer insulated container to continue to cook at a temperature above a predetermined minimum cooking temperature by heat retained in said inner and outer containers, without additional heat being provided from said heat generator.

14. The method of claim 13, further comprising the steps of i) sensing when the temperature of said inner cooking pot falls to a predetermined minimum warm temperature below said predetermined cooking temperature, and j) heating said inner cooking pot to keep the ingredients in said inner cooking pot warm.

15. The method of claim 14, further comprising the step of k) sensing when the temperature of said inner cooking pot rises to a predetermined maximum warm temperature below said predetermined cooking temperature, and l) discontinuing heating of said inner cooking pot to keep the temperature of said inner cooking pot at or above said minimum warming temperature.

16. The method of claim 15, further comprising the steps of repeating steps i), j), k) and l).

17. The method of claim 13, further comprising the steps of sensing the temperature of said inner cooking pot, and measuring the period of elapsed time from said step of discontinuing heating until the temperature of said inner cooking pot falls to said predetermined minimum cooking temperature.

18. The method of claim 17, further comprising the step of displaying said elapsed time from said step of discontinuing heating until the temperature of said inner cooking pot reaches said predetermined minimum cooking temperature.

19. The method of claim 17, further comprising the step of continuously displaying the elapsed time from said step of discontinuing heating until the temperature of said inner cooking pot reaches said predetermined minimum cooking temperature.

20. The method of claim 13, wherein said minimum cooking temperature is approximately 90° C.

21. The method of claim 15, wherein said minimum warm temperature is approximately 70° C.

22. The method of claim 15, wherein said maximum warm temperature is approximately 88° C.

* * * * *